US012037216B2

(12) United States Patent
Nakajima et al.

(10) Patent No.: US 12,037,216 B2
(45) Date of Patent: Jul. 16, 2024

(54) CONVEYANCE DEVICE AND IMAGE FORMING APPARATUS

(71) Applicant: CANON KABUSHIKI KAISHA, Tokyo (JP)

(72) Inventors: Keita Nakajima, Shizuoka (JP); Ko Katahira, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 17/667,191

(22) Filed: Feb. 8, 2022

(65) Prior Publication Data

US 2022/0267109 A1 Aug. 25, 2022

(30) Foreign Application Priority Data

Feb. 24, 2021 (JP) ................................ 2021-027932

(51) Int. Cl.
*B65H 5/36* (2006.01)
*B65H 1/04* (2006.01)
(Continued)

(52) U.S. Cl.
CPC ............. *B65H 5/36* (2013.01); *B65H 3/0653* (2013.01); *B65H 1/04* (2013.01); *B65H 2301/342* (2013.01); *B65H 2402/441* (2013.01); *B65H 2402/45* (2013.01); *G03G 21/1633* (2013.01); *G03G 21/1638* (2013.01)

(58) Field of Classification Search
CPC ........... G03G 21/1633; G03G 21/1638; G03G 2215/00544; G03G 2221/1675; G03G 2221/169; B65H 5/36; B65H 3/0653; B65H 1/04; B65H 2301/342; B65H 2402/441; B65H 2402/45
See application file for complete search history.

(56) References Cited

U.S. PATENT DOCUMENTS

2008/0232847 A1* 9/2008 Kusukawa ......... G03G 21/1633 399/114
2017/0060078 A1* 3/2017 Uohashi ............ G03G 21/1633

FOREIGN PATENT DOCUMENTS

JP 62031640 A 2/1987
JP 2000219438 A 8/2000
(Continued)

*Primary Examiner* — Sandra Brase
(74) *Attorney, Agent, or Firm* — CANON U.S.A., INC. IP Division

(57) ABSTRACT

A conveyance device to convey a sheet includes an apparatus main body including a regulating portion, an opening/closing door including a first guide portion, and a conveyance guide supported by the opening/closing door and having a second guide portion and a regulated portion. The opening/closing door moves relative to the apparatus main body between an open position and a closed position where the conveyance guide is placed between the apparatus main body and the opening/closing door. When the conveyance guide pivots in an away direction where the second guide portion moves away from the first guide portion with the opening/closing door in the open position, the regulated portion contacts the regulating portion to regulate rotation of the conveyance guide in the away direction. The second guide portion and the regulated portion are on one side of a pivot axis in a direction that is perpendicular to a pivot axis direction.

14 Claims, 14 Drawing Sheets

(51) Int. Cl.
*B65H 3/06* (2006.01)
*G03G 21/16* (2006.01)

(56) References Cited

FOREIGN PATENT DOCUMENTS

| | | | |
|---|---|---|---|
| JP | 2002062698 | A | 2/2002 |
| JP | 2003307892 | A | 10/2003 |
| JP | 2009242067 | A | 10/2009 |
| JP | 2017043489 | A | 3/2017 |
| JP | 6303640 | B2 | 4/2018 |

* cited by examiner

Comparative Example

Comparative Example

Comparative Example

CONVEYANCE DEVICE AND IMAGE FORMING APPARATUS

BACKGROUND

Field

The present disclosure relates to a conveyance device for conveying a sheet and an image forming apparatus for forming an image on a sheet.

Description of the Related Art

In image forming apparatuses, such as electrophotographic copying machines, electrophotographic printers (LED printers, laser beam printers, etc.), facsimile machines, and word processors, a sheet may become jammed inside the image forming apparatus.

Japanese Patent No. 6303640 describes a configuration in which a sheet conveyance device has an opening/closing door rotatably supported by a housing and a sheet conveyance unit rotatably supported by the opening/closing door, and a sheet passes through between the opening/closing door and the sheet conveyance unit. If a sheet becomes jammed between the opening/closing door and the sheet conveyance unit, the sheet can be removed from between the opening/closing door and the sheet conveyance unit by opening the opening/closing door and rotating the sheet conveyance unit relative to the opening/closing door.

When the opening/closing door is open with a sheet jammed between the opening/closing door and the conveyance guide, the conveyance guide may receive a force from the sheet in the direction in which the conveyance guide moves away from the opening/closing door.

At this time, to regulate rotation of the conveyance guide by a regulating portion provided on the opening/closing door, the regulating portion is disposed on the opposite side of the rotational center (the pivot axis) of the conveyance guide from a part where the conveyance guide receives force. As a result, when the conveyance guide receives force from the sheet, the load imposed on the conveyance guide in the vicinity of the pivot axis increases.

SUMMARY

The present disclosure provides a conveyance device capable of reducing the load in the vicinity of the pivot axis of the conveyance guide when the opening/closing door is opened with a sheet jammed between the opening/closing door and the conveyance guide and an image forming apparatus using the conveyance device.

According to an aspect of the present disclosure, a conveyance device configured to convey a sheet includes an apparatus main body including a regulating portion, an opening/closing door including a first guide portion configured to guide the sheet, a conveyance guide supported by the opening/closing door in a pivotable manner about a pivot axis, wherein the conveyance guide includes a second guide portion configured to guide the sheet and a regulated portion, where the second guide portion is disposed facing the first guide portion so that a first path through which the sheet passes is formed between the first guide portion and the second guide portion, and a conveyance unit including a first conveyance roller configured to convey the sheet toward the first path, wherein the opening/closing door is configured to be movable relative to the apparatus main body between a closed position at which the conveyance guide is placed between the apparatus main body and the opening/closing door and an open position at which the conveyance guide is retracted from the closed position, wherein, when the conveyance guide pivots in an away direction in which the second guide portion moves away from the first guide portion in a state where the opening/closing door is in the open position, the regulated portion is brought into contact with the regulating portion to regulate rotation of the conveyance guide in the away direction, and wherein the second guide portion and the regulated portion are disposed on one side of the pivot axis in a perpendicular direction that is perpendicular to a direction of the pivot axis.

Further features of the present disclosure will become apparent from the following description of exemplary embodiments with reference to the attached drawings.

DESCRIPTION OF THE EMBODIMENTS

An example of the configuration according to the present disclosure is described below with reference to the accompanying drawings. Note that the dimensions, material, shape, arrangement, and the like of the constituent elements described in the embodiments should be changed as appropriate in accordance with the configuration and various conditions of an apparatus to which the present disclosure is applied.

First Embodiment

An image forming apparatus 1 is described with reference to FIG. 1. According to the present embodiment, the image forming apparatus 1 is a laser beam printer using the electrophotographic technique. Note that the present disclosure can also be applied to image forming apparatuses, such as electrophotographic copiers, LED printers, inkjet printers, facsimile machines, and word processors.

Figure 1:
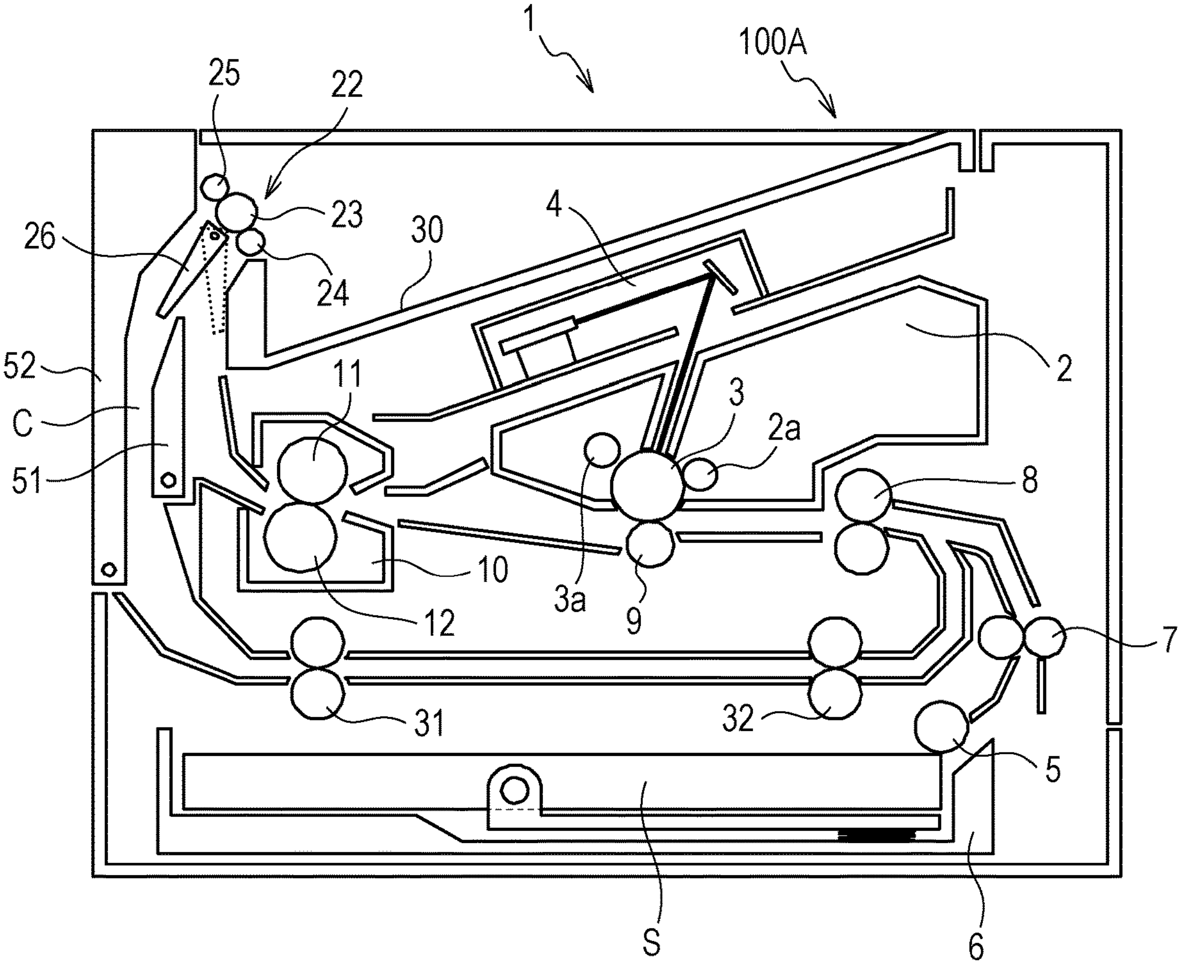
FIG. 1 is a cross-sectional view of an image forming apparatus.

FIG. 1 is a cross-sectional view of the image forming apparatus 1. The image forming apparatus 1 illustrated in FIG. 1 has an apparatus main body 100A and a jam clearance door (a door) 52 serving as an opening/closing door. The door 52 is supported by the apparatus main body 100A. The door 52 is configured to be movable relative to the apparatus main body 100A. The image forming apparatus 1 includes a sheet feeding unit, an image forming unit that forms an image on a sheet S, a fixing unit 10, a reverse conveyance portion 22, and a double-sided conveying unit.

The image forming apparatus 1 includes a process cartridge 2 serving as the image forming unit that forms images on a sheet S. The process cartridge 2 is configured to be removable from the apparatus main body 100A. The apparatus main body 100A and the door 52 may also be referred to as a housing of the image forming apparatus 1. It can be said that the process cartridge 2 is configured to be removable from the housing of the image forming apparatus 1. According to the present embodiment, the process cartridge 2 forms an image on the sheet S directly. However, the image forming unit may form an image on the sheet S via an intermediate transfer member.

The process cartridge 2 includes a process unit, such as a photoconductive drum 3 serving as the image bearing member that bears an electrostatic latent image, a development roller 2*a* serving as the developer bearing member that bears toner which is a developer agent, and a charging roller 3*a* serving as a charging member. The image forming apparatus 1 includes a scanner unit 4 serving as an exposure unit, which is disposed above the process cartridge 2.

The scanner unit 4, the sheet feeding unit, the process cartridge 2, the fixing unit 10, the reverse conveyance portion 22, and the double-sided conveying unit are housed inside the apparatus main body 100A.

The surface of the photoconductive drum 3 is charged to a predetermined potential of negative polarity by the charging roller 3*a*. The scanner unit 4 exposes the surface of the photoconductive drum 3 with light based on an image signal. As a result, an electrostatic latent image is formed on the surface of the photoconductive drum 3. Toner of negative polarity is supplied from the development roller 2*a* to the photoconductive drum 3, and the electrostatic latent image is developed.

The sheet feeding unit includes a sheet feeding roller 5 mounted in the image forming apparatus 1 and a sheet supplying cassette 6 serving as a sheet feed tray in which sheets S can be loaded. The sheet supplying cassette 6 is configured to be removable from the image forming apparatus 1. The sheet feeding roller 5 is rotated by a sheet feeding drive unit (not illustrated). The sheets S stored in the sheet supplying cassette 6 are separated one by one by the rotation of the sheet feeding roller 5, and the separated sheet is conveyed. The sheet S fed from the sheet supplying cassette 6 is conveyed to the registration roller pair 8 by a conveyance roller pair 7. After a skew correction is performed by the registration roller pair 8, the sheet S is conveyed to a transfer unit.

The transfer unit includes a transfer roller 9 serving as a transfer member. A voltage of positive polarity is applied to the transfer roller 9 by a voltage applying unit (not illustrated). In this manner, a toner image borne by the photoconductive drum 3 is transferred from the photoconductive drum 3 to the sheet S.

The fixing unit 10 is disposed downstream of the transfer unit in the conveyance direction of the sheet S. The fixing unit 10 fixes the unfixed toner image transferred onto the sheet S. The fixing unit 10 includes a heating roller 11, which is a fixing member including a built-in heater, and a pressing roller 12, which is a pressing member that rotates in contact with the heating roller 11. The sheet S is nipped between the heating roller 11 and the pressing roller 12 and is conveyed. In a fixing nip portion formed by the heating roller 11 and the pressing roller 12, heat and pressure are applied to the sheet S so that the toner image is fixed onto the surface of the sheet S.

The sheet S including the toner image fixed thereon is conveyed by the fixing unit 10. A first conveyance roller (a discharge roller) 23, a sheet discharge driven roller 24, a reverse driven roller 25, and a duplex flapper 26 serving as a switching member are disposed downstream of the fixing unit 10 in a conveyance direction in which the sheet S is conveyed by the fixing unit 10.

The discharge roller 23 and the sheet discharge driven roller 24 form a discharge nip portion (a discharge portion) for discharging the sheet S from the apparatus main body 100A. A tray (a discharge tray) 30 is provided outside of the apparatus main body 100A to stack the sheet S discharged from the apparatus main body 100A.

In addition, to convey the sheet S to the double-sided conveyance path C by the discharge roller 23, the discharge roller 23 and the reverse driven roller 25 form a reverse nip portion (the reverse conveyance portion) 22.

The duplex flapper 26 is selectively movable to a first guide position (a discharge position) and to the second guide position (a reverse position). The duplex flapper 26 positioned at the first guide position leads the sheet S to the discharge nip portion. The duplex flapper 26 positioned at the second guide position leads the sheet S to the reverse nip portion.

In FIG. 1, the duplex flapper 26 positioned at the first guide position is denoted by a solid line, while the duplex flapper 26 positioned at the second guide position is denoted by a dotted line.

When image formation is performed on only one side of the sheet S, the duplex flapper 26 is positioned at the first guide position. The sheet S including an image formed on one side thereof is conveyed by the fixing unit 10 and is led to the discharge nip portion by the duplex flapper 26. The discharge roller 23 rotates counterclockwise in the drawings, and the sheet S is discharged onto the tray 30 formed outside of the apparatus main body 100A. The operation of forming an image on only one side of the sheet S is also referred to as a single-sided image forming operation (single-sided printing).

The image forming apparatus 1 can perform a double-sided image forming operation (double-sided printing), in which images are formed on both sides of a sheet S. In double-sided printing, after the image is formed on one side of the sheet S, the image is formed on the other side of the sheet S.

When double-sided printing is performed, the duplex flapper 26 is positioned in the second guide position first. The sheet S including an image formed on one side (the front surface) is conveyed by the fixing unit 10 and is led to the reverse nip portion 22 by the duplex flapper 26. At this time, the discharge roller 23 is rotating clockwise in the drawings, and the sheet S is temporarily conveyed toward the discharge tray 30 formed outside of the apparatus main body 100A. At the time the trailing edge of the sheet S reaches a predetermined position, the discharge roller 23 stops. Then, the duplex flapper 26 moves to the first guide position, and the discharge roller 23 rotates counterclockwise. In this manner, the sheet S is conveyed with the previous trailing edge thereof located downstream in the conveyance direction. This conveyance is called "reverse conveyance of the sheet S".

That is, the discharge roller 23 can rotate in a first rotation direction and in a second rotation direction opposite to the first rotation direction. The discharge roller 23 rotates in the first rotation direction to convey the sheet S in a first direction and rotates in the first rotation direction to convey the sheet S in the second direction (the direction opposite to the first direction).

The discharge roller 23 rotates in the first rotation direction to convey the sheet S that has been conveyed to the reverse nip portion 22 toward the outside of the apparatus main body 100A. Thereafter, the discharge roller 23 rotates in the second rotation direction to convey the sheet S toward the double-sided conveyance path C.

The image forming apparatus 1 includes a reverse conveyance roller 31 (a second conveyance roller) configured to convey the sheet S conveyed by the discharge roller 23. The double-sided conveying path C is set between the discharge roller 23 and the reverse conveyance roller 31. The reverse conveyance roller 31 is configured to convey the sheet S that has passed through the double-sided conveying path C.

The reversely conveyed sheet S is conveyed by a reverse conveyance roller pair including the reverse conveyance roller 31 and a re-feed roller pair including a re-feed roller 32 and reaches the registration roller pair 8 with the front surface and back surface reversed. The image forming operation performed on the back surface of the sheet S is the same as the image forming operation performed on the front surface of the sheet S. The sheet S including images formed on the front and back surfaces is conveyed by the fixing unit 10 and is led to the discharge nip portion by the duplex flapper 26 in the first guide position. The discharge roller 23 is rotating counterclockwise (in the first direction) in the drawings, and the sheet S is discharged onto the tray 30.

The portion of the image forming apparatus 1 obtained after excluding at least the process cartridge 2 from the configuration can be called a conveyance device for conveying the sheet S. That is, the image forming apparatus 1 includes the conveyance device and the process cartridge 2. The conveyance device includes the door 52, the apparatus main body 100A, and a conveyance guide 51 (described below).

The conveyance device further includes a conveyance unit for conveying the sheet S. The conveyance unit includes at least the discharge roller 23. According to the present embodiment, the conveyance unit includes the reverse conveyance roller 31. The sheet feeding roller 5, the conveyance roller pair 7, the registration roller pair 8, the photoconductive drum 3, the transfer roller 9, the fixing unit 10, the sheet discharge driven roller 24, and the reverse driven roller 25 can also be called part of the conveyance unit. The conveyance unit can also be said to include the discharge nip portion (the discharge portion) and the reverse nip portion (the reverse conveyance portion) 22.

Sheet Jam Clearance

If sheet jam (or simply "jam") occurs, that is, if a sheet S is jammed inside the conveyance path, the sheet S needs to be removed from the conveying path. The configuration for clearing jam is described below with reference to FIG. 2, FIGS. 3A and 3B, and FIGS. 4A and 4B.

Figure 2:
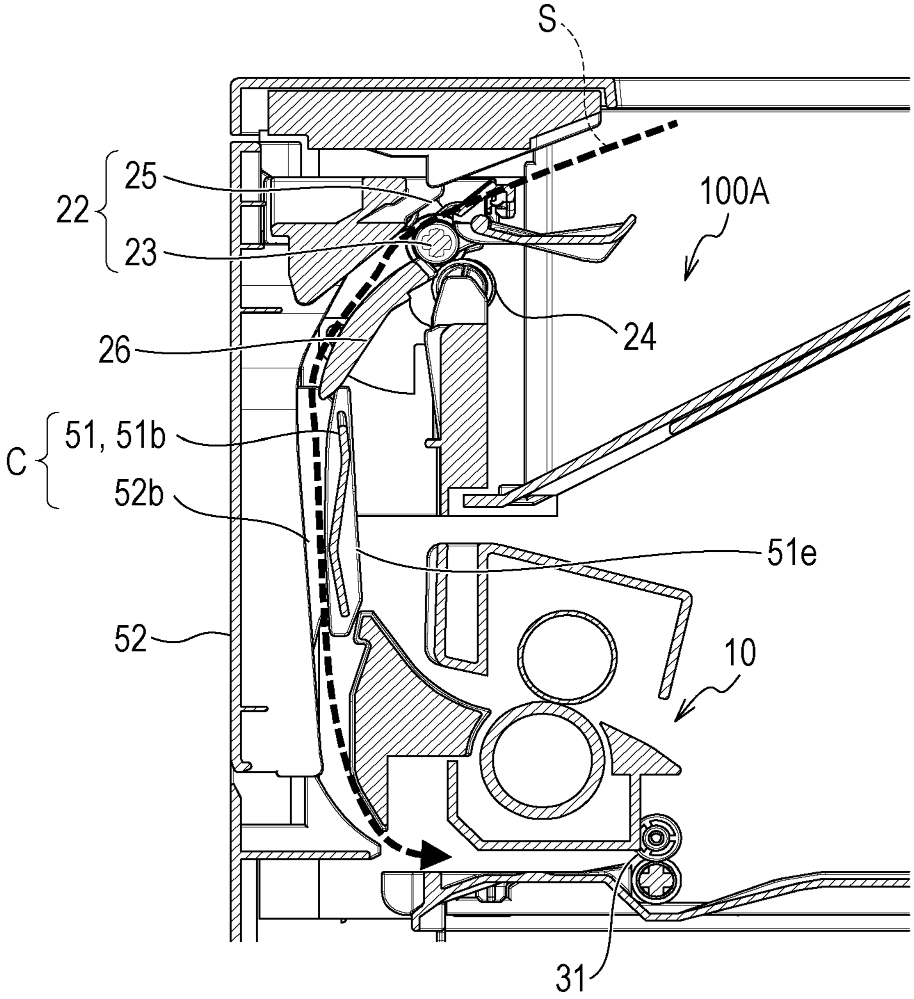
FIG. 2 is a cross-sectional view of the image forming apparatus according to a first embodiment.

FIG. 2 is a cross-sectional view of the image forming apparatus 1 according to the present embodiment. FIG. 2 is a cross-sectional view of the sheet S at the midpoint in the width direction of the sheet S. Note that the width direction of the sheet S is the direction perpendicular to the conveyance direction of the sheet S and the thickness direction of the sheet S. The axes of rotation of the discharge roller 23, the reverse conveyance roller 31, and other rollers extend in the width direction of the sheet S.

FIGS. 3A and 3B and FIGS. 4A and 4B illustrate the door 52 and the conveyance guide 51 according to the present embodiment.

Figure 3A:
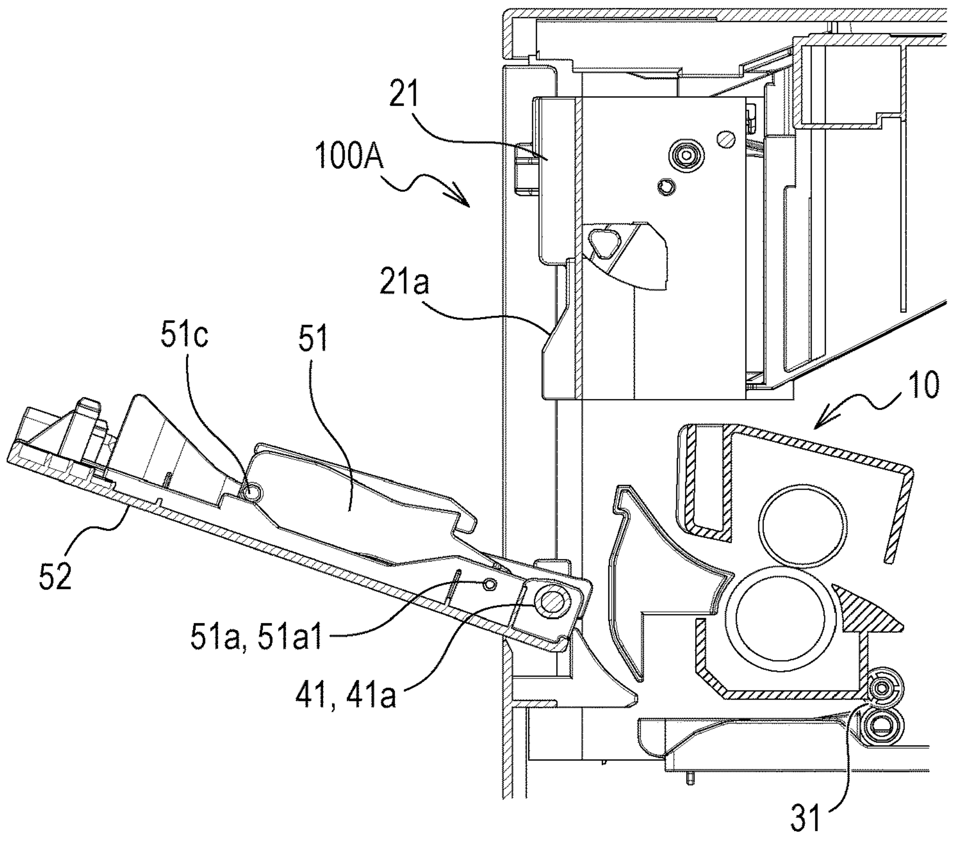
FIGS. 3A and 3B illustrate a door and a conveyance guide according to the first embodiment.
Figure 3B:
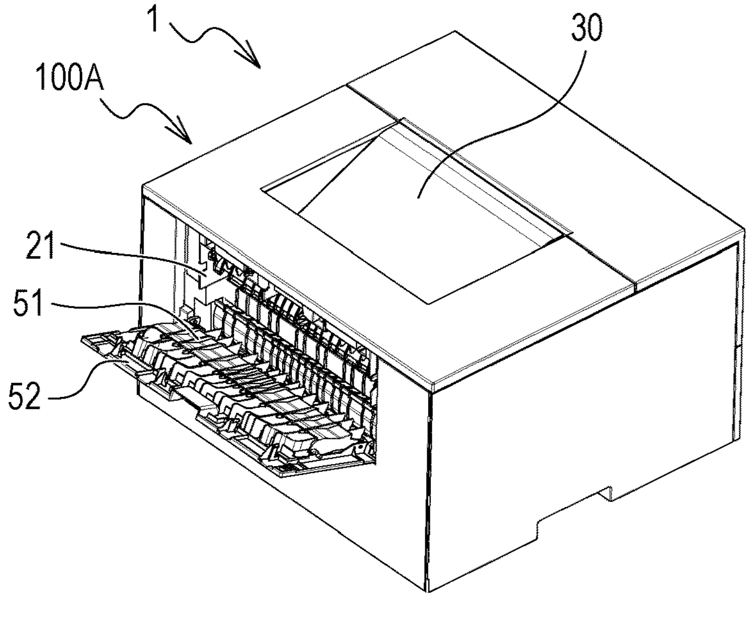
Figure 4A:
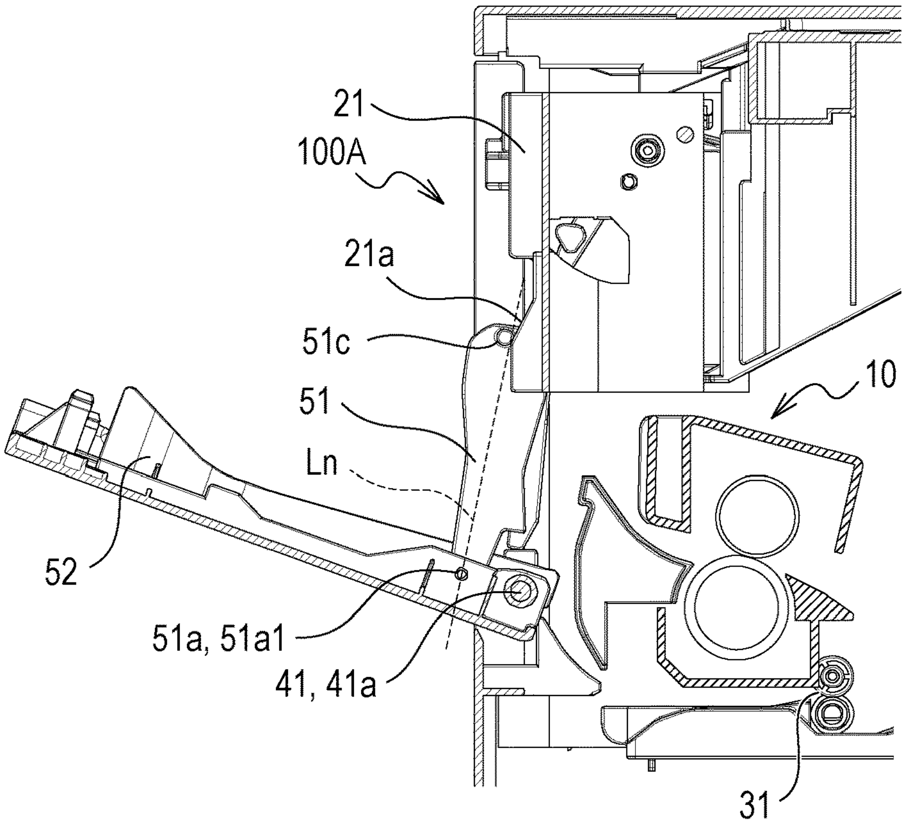
FIGS. 4A and 4B illustrate the door and the conveyance guide according to the first embodiment.
Figure 4B:
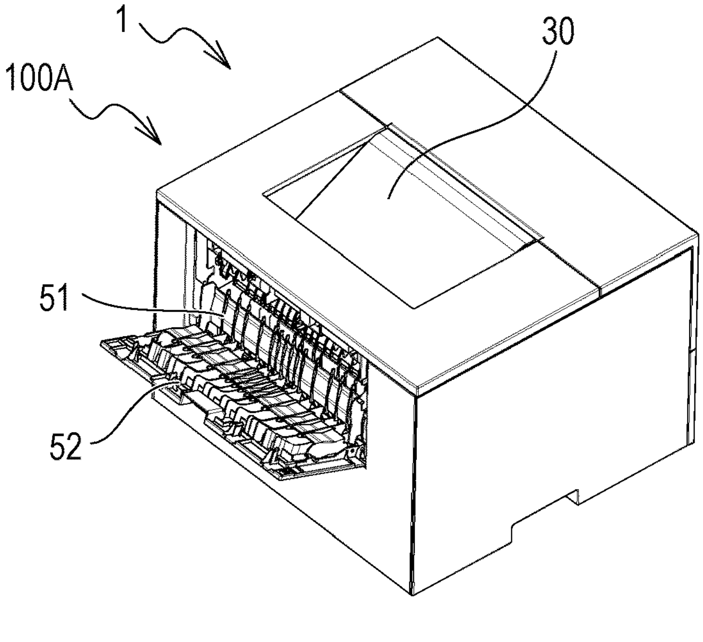

FIG. 3A and FIG. 4A are cross-sectional views of the door 52 and the conveyance guide 51. FIG. 3B and FIG. 4B are perspective views of the door 52 and the conveyance guide 51.

FIG. 2, FIG. 3A, and FIG. 4A are views of the conveyance guide 51, as viewed in the direction of the axis of rotation of the conveyance guide 51. According to the present embodiment, the directions of the axis of rotation of the conveyance guide 51, the axis of rotation of the door 52, the axis of rotation of the discharge roller 23, and the axis of rotation of the reverse conveyance roller 31 are parallel to one another.

As described above, the door 52 is movable relative to the apparatus main body 100A. More specifically, the door 52 is configured to be movable relative to the apparatus main body 100A between a closed position and an open position in which the door 52 is retracted from the closed position. In FIG. 2, the door 52 is in the closed position. In FIG. 3A, FIG. 3B, FIG. 4A, and FIG. 4B, the door 52 is in the open position.

As illustrated in FIG. 2, when the door 52 is in the closed position, the conveyance guide 51 (described below) is covered by the door 52. That is, the conveyance guide 51 is housed between the apparatus main body 100A and the door 52.

The apparatus main body 100A includes a discharging frame 21 (a reverse frame) 21. The discharging frame 21 supports the discharge roller 23, the sheet discharge driven roller 24, the reverse driven roller 25, and a duplex flapper 26.

The image forming apparatus 1 has door support portions 41 in the lower section of the door 52. The door support portions 41 are disposed at either end of the door 52 in the width direction of the sheet S. A shaft provided on one of the apparatus main body 100A and the door 52 is inserted into a hole formed in the other, so that the door support portions 41 are formed. The door 52 pivots about the door support portion 41 and moves relative to the apparatus main body 100A, between the open position and the closed position. The door 52 is supported by the apparatus main body 100A in a pivotable manner about a pivot axis 41*a*. According to the present embodiment, a shaft of the apparatus main body 100A is inserted into a hole 52*a* formed in the door 52 and, thus, the door support portion 41 is formed (refer to FIGS. 8B and 8C).

The image forming apparatus 1 includes a conveyance guide 51 that is rotatably supported by the door 52. Guide support portions 51*a* are provided in the lower section of the conveyance guide 51. The guide support portions 51*a* are disposed at either end of the conveyance guide 51 in the width direction of the sheet S. A shaft provided on one of the conveyance guide 51 and the door 52 is inserted into a hole formed in the other so that the guide support portion 51*a* is formed. The conveyance guide 51 is supported by the door 52 in a pivotable manner about a pivot axis 51*a*1. The door 52 and the conveyance guide 51 together can be called a door unit (a jam clearance door unit).

As illustrated in FIG. 2, the door 52 has a sheet guide portion 52*b* serving as a first guide portion configured to guide the sheet S. The conveyance guide 51 has a sheet guide portion 51*b* serving as a second guide portion configured to guide the sheet S. The sheet guide portion 52*b* of the door 52 and the sheet guide portion 51*b* of the conveyance guide 51 face each other, and a double-sided conveying path C serving as the conveyance path (a first path, the first conveyance path) is formed between the sheet guide portion 52*b* and the sheet guide portion 51*b*. The reversely conveyed sheet S passes through the double-sided conveying path C. The sheet S can be brought into contact with the sheet guide portion 51*b* and the sheet guide portion 52*b*.

The conveyance guide 51 can be moved relative to the door 52 in a state where the door 52 is in the open position.

FIGS. 3A and 3B illustrate the conveyance guide 51 rotated in a direction in which the sheet guide portion 51*b* moves closer to the sheet guide portion 52*b*. At this time, the sheet S can be removed from between the conveyance guide 51 and the apparatus main body 100A in the case where jamming occurs, for example, between the fixing unit 10 and the discharge roller 23.

FIGS. 4A and 4B illustrate the conveyance guide 51 rotated in a direction in which the sheet guide portion 51*b* moves away from the sheet guide portion 52*b*. At this time, the sheet S can be removed from between the conveyance guide 51 and the door 52 when, for example, jamming occurs during reverse conveyance.

According to the present embodiment, as illustrated in FIG. 4A, the conveyance guide 51 has a regulated portion 51*c*, and the discharging frame 21 of the apparatus main body 100A has a regulating portion 21*a*. When the conveyance guide 51 is rotated in a direction in which the sheet guide portion 51*b* moves away from the sheet guide portion 52*b* (an away direction) in the state where the door 52 is in the open position, the regulated portion 51*c* and the regulating portion 21*a* are brought into contact with each other.

As a result, the rotation of the conveyance guide 51 in the away direction is regulated.

Image Forming Apparatus According to Comparative Example

Figure 15A:
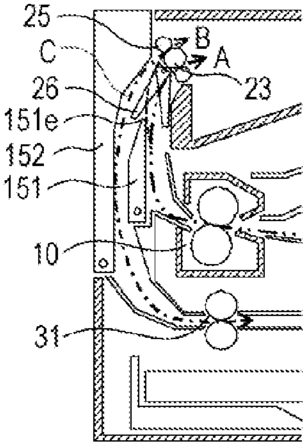
FIGS. 15A to 15C illustrate an image forming apparatus according to a comparative example.
Figure 15B:
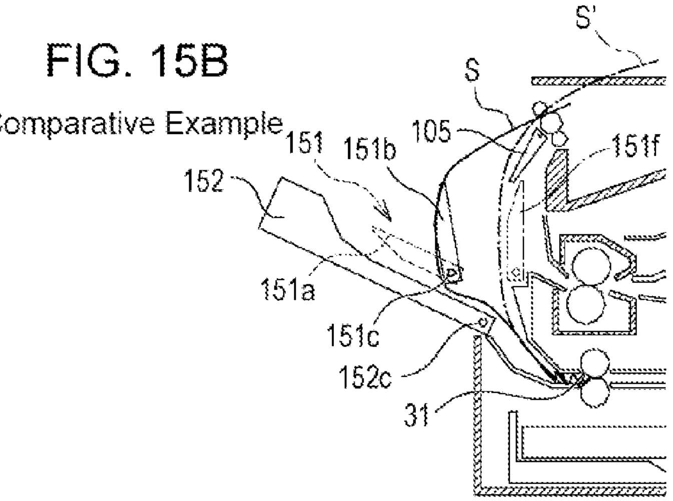
Figure 15C:
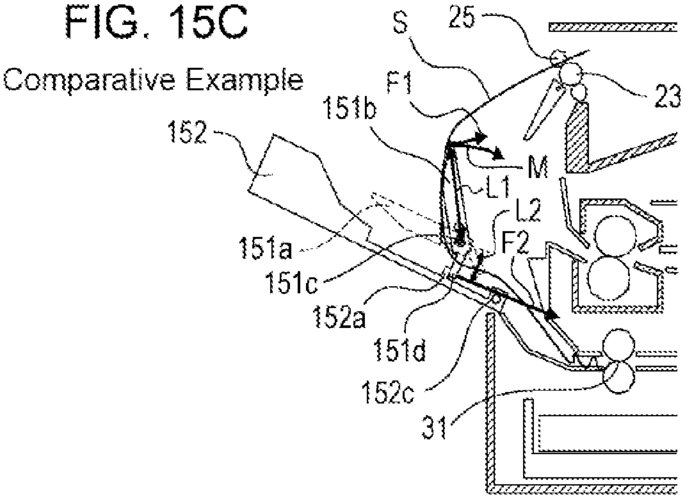

The configuration of a door of an image forming apparatus according to a comparative example is described below with reference to FIGS. 15A to 15C. FIGS. 15A to 15C are explanatory diagrams of the image forming apparatus according to the comparative example. That is, FIGS. 15A to 15C are cross-sectional views of a door 152 and a conveyance guide 151 according to the comparative example.

As illustrated in FIG. 15A, when a sheet S is discharged, the sheet S is conveyed along the path (conveyance path) A. When double-sided printing is performed, the duplex flapper 26 moves from the position indicated by the solid line to the position indicated by the dotted line, and the sheet S is conveyed along a path (a conveyance path) B. After the trailing edge of the sheet S passes through an end 151*e* of the conveyance guide 151, the discharge roller 23 stops rotating. The duplex flapper 26 pivots to the position indicated by the solid line again and, thereafter, the discharge roller 23 rotates backward. As a result, the sheet S is conveyed to the double-sided conveying path C.

If jamming occurs in the image forming apparatus according to the comparative example, the door 152 can be opened to remove the sheet S and make each conveying path available, as in the embodiment.

As illustrated in FIG. 15B, if jamming of the sheet S occurs in the vicinity of the reverse conveyance roller 31, the user can pivot the door 152 about a rotational center 152*c* to open the door 152 and remove the sheet S. Before the door 152 is opened, the sheet S is in a position S' indicated by the alternate long and short dash line, and the conveyance guide 151 is in a position 151*f*.

When the door 152 is opened, the conveyance guide 151 moves from the position 151*f* to the position 151*a* or 151*b* together with the door 152. When the door 152 is opened in a state where a sheet S is located in the double-sided conveying path C, the sheet S is pulled out from the position S' to a position indicated by the solid line by the conveyance guide 151. At this time, if the sheet S is nipped between the discharge roller 23 and the reverse driven roller 25, the force required to pull out the sheet S by the conveyance guide 151 increases. That is, the reaction force that the sheet S exerts against the conveyance guide 151 increases.

As illustrated in FIG. 15C, when the door 152 is opened, a reaction force F1 of the force of the conveyance guide 151 pushing the sheet S exerts against the conveyance guide 151. The conveyance guide 151 pivots about a rotational center 151*c* in a direction M and moves from the position 151*a* to the position 151*b*.

In the configuration according to the comparative example, the rotation of the conveyance guide 151 is regulated by contact of a regulated portion 151*d* of the conveyance guide 151 with a regulating portion 152*a* provided on the door 152. According to the configuration of the comparative example, the regulated portion 151*d* is disposed on one side of the rotational center 151*c* in a direction perpendicular to the axis of rotation of the conveyance guide 151, and a portion of the conveyance guide 151 that receives the reaction force F1 from the sheet S is disposed on the other side.

If the door 152 is further opened after the contact of regulated portion 151*d* with the regulating portion 152*a*, a reaction force F2 received from the regulating portion 152*a* is applied to the conveyance guide 151.

If the rotational center 151*c* of the conveyance guide 151 is disposed farther away from the door 152, the size of the apparatus increases. For this reason, the rotational center 151*c* is disposed in the vicinity of the door 152. As a result, a distance L2 between the rotational center 151*c* and the point to which the reaction force F2 is applied is less than a distance L1 between the rotational center 151*c* and the point to which the reaction force F1 is applied. The product of the reaction force F1 and the distance L1 is the same as the product of the reaction force F2 and the distance L2. Therefore, the reaction force F2 is greater than the reaction force F1.

The reaction force F1 and the reaction force F2 act on the rotational center 151*c* of the conveyance guide 151. For this reason, it is desirable to increase the rigidity around the rotational center 151*c*. However, an increase in the rigidity at the rotational center 151*c* may increase the cost of the conveyance guide 151, which increases the cost of the conveyance guide 151.

In addition, to increase the distance L2, the regulated portion 151*d* needs be disposed away from the rotational center 151*c*. However, since the regulated portion 151*d* needs to be disposed on the opposite side of the end 151*e*, the size of the conveyance guide 151 may increase.

Regulation by Conveyance Guide

The configuration that regulates the rotation of the conveyance guide 51 according to the present embodiment is described below.

As described above, when the conveyance guide 51 rotates in the direction in which the sheet guide portion 51*b* moves away from the sheet guide portion 52*b* (the away direction), the double-sided conveying path C is open up. The rotation of the conveyance guide 51 in the direction to open up the double-sided conveying path C is regulated by contact of the regulated portion 51*c* provided in the conveyance guide 51 with the regulating portion 21*a* provided in the discharging frame 21.

The regulated portions 51*c* are provided at either end of the conveyance guide 51 in the width direction of the sheet S. The regulating portions 21*a* are disposed at a positions corresponding to the regulated portions 51*c* provided at either end of the conveyance guide 51. The regulated portions 51*c* and the regulating portions 21*a* are disposed outside of the double-sided conveying path C in the width direction of the sheet S.

As used herein, the direction perpendicular to the direction of the pivot axis 51*a*1 is referred to as a "perpendicular direction". FIG. 4A illustrates the door 52 in the open position and the regulated portion 51*c* of the conveyance guide 51 in contact with the regulating portion 21*a*. The relationship among the pivot axis 51*a*1, the regulated portion 51*c*, the sheet guide portion 51*b*, and the door 52 is described below.

The sheet guide portion 51*b* and the regulated portion 51*c* are disposed on one side of the pivot axis 51*a*1 in the perpendicular direction. In addition, at least part of the door 52 is disposed on the other side of the pivot axis 51*al*. As a result, when the conveyance guide 51 receives a reaction force from the sheet S and the regulating portion 21*a*, the load acting on the vicinity of the pivot axis 51*a*1 can be reduced.

Furthermore, in the situation illustrated in FIG. 4A, let Ln denote a straight line extending between a point at which the regulated portion 51*c* is in contact with the regulating portion 21*a* and the pivot axis 51*a*1 as viewed in the direction of the pivot axis 51*a*1 of the conveyance guide 51. Then, the sheet guide portion 51*b* and the regulated portion 51*c* are disposed on one side of the pivot axis 51*a*1 in the direction of the straight line Ln (the direction along the straight line Ln). In addition, at least part of the door 52 is disposed on the other side of the pivot axis 51*a*1.

In the situation illustrated in FIG. 4A, the distance between the regulated portion 51*c* and the door 52 is greater than the distance between the pivot axis 51*a*1 and the door 52 in the perpendicular direction. The distance between the sheet guide portion 51*b* and the door 52 is greater than the distance between the pivot axis 51*a*1 and the door 52 in the perpendicular direction.

Furthermore, the conveyance guide 51 has a first end and a second end opposite the first end in the perpendicular direction. The pivot axis 51*a*1 is disposed closer to the first end than to the central portion of the conveyance guide 51, and the regulated portion 51*c* is disposed closer to the second end than to the central portion of the conveyance guide 51 in the perpendicular direction. According to the present embodiment, the pivot axis 51*a*1 is disposed in the lower section of the conveyance guide 51, and the regulated portion 51*c* is disposed at the upper section of the conveyance guide 51. The regulated portion 51*c* is located closer to the upstream end than to the downstream end of the conveyance guide 51 in the conveyance direction of the sheet S in the double-sided conveying path C.

When the upper part of the conveyance guide 51 is pushed toward the discharging frame 21 in a state where the regulated portion 51*c* is in contact with the regulating portion 21*a*, the moment around the contact point between the regulating portion 21*a* and the regulated portion 51*c* decreases.

The situation in which the door 52 is located in the open position is the situation in which the door 52 is fully open. According to the present embodiment, no matter where the door 52 is positioned between the closed position and the open position, the regulated portion 51*c* and the regulating portion 21*a* are in contact with each other when the conveyance guide 51 is rotated in the away direction. That is, when the conveyance guide 51 is rotated in the away direction with the door 52 positioned between the closed position and the open position, the regulated portion 51*c* and the regulating portion 21*a* can be brought into contact with each other.

According to the present embodiment, the regulated portions 51*c* are provided at either end of the conveyance guide 51 in the width direction of the sheet S. However, only one regulated portion 51*c* may be provided at one end of the conveyance guide 51.

Load Imposed on Conveyance Guide

The load imposed on the conveyance guide 51 is described below with reference to FIGS. 5A and 5B and FIG. 6.

Figure 5A:
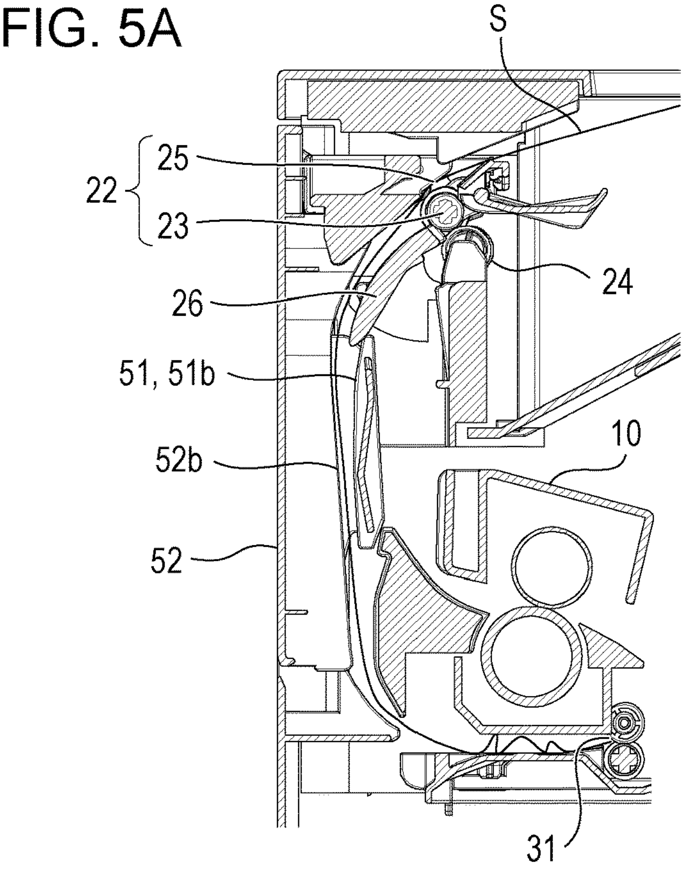
FIGS. 5A and 5B illustrate a sheet jam that occurs in a double-sided conveying path according to the first embodiment.
Figure 5B:
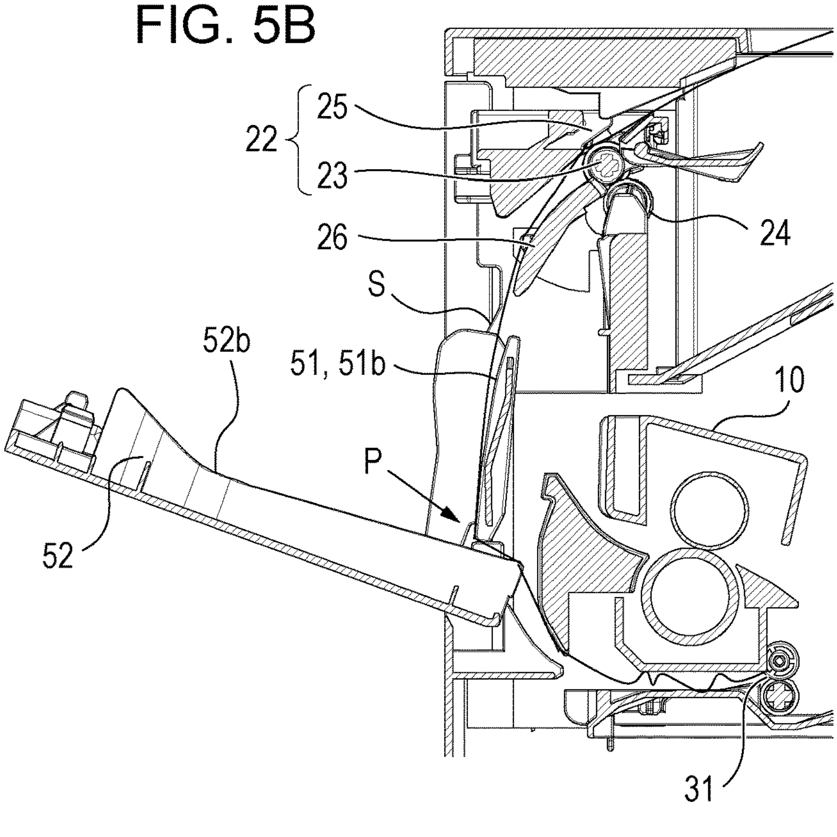

FIGS. 5A and 5B illustrate sheet jam that occurs in the double-sided conveying path C. FIG. 5A illustrates the situation where sheet jam occurs in the double-sided conveying path C and the door 52 is in the closed position. FIG. 5B illustrates the situation where sheet jam occurs in the double-sided conveying path C and the door 52 is in the open position. FIG. 6 illustrates the situation where the door 52 is in the open position and the conveyance guide 51 has been rotated in the direction away from the door 52.

As illustrated in FIG. 5A, when the leading edge of a reversely conveyed sheet S passes through the double-sided conveying path C and reaches a position upstream of the reverse conveyance roller 31, sheet jam may occur in the double-sided conveying path C. To remove the sheet S, the user of the image forming apparatus 1 moves the door 52 from the closed position to the open position, as illustrated in FIG. 5B.

At this time, the length of the sheet S is greater than the length between the downstream end of the sheet guide portion 51*b* and the discharge roller 23 in the conveyance direction of the sheet S in the duplex conveying path C. In addition, according to the present embodiment, the sheet S has such a length to be capable of contacting the reverse conveyance roller 31 while being in contact with the discharge roller 23. That is, the sheet supplying cassette 6 is capable of loading (storing) a sheet S including the above-described length.

As illustrated in FIGS. 5A and 5B, when the user opens the door 52 with the sheet S being pinched by the reverse conveyance portion 22, part of the conveyance guide 51 located in the vicinity of the guide support portion 51*a* moves together with the door 52.

As a result, the sheet S is pulled out from the position illustrated in FIG. 5A at the position of a portion P illustrated in FIG. 5B. At this time, the sheet S is pulled between the reverse conveyance portion 22 and the portion P. In addition, since the sheet guide portion 51*b* of the conveyance guide 51 is in contact with the sheet S, the sheet guide portion 51*b* receives the reaction force from the sheet S. As a result, the conveyance guide 51 pivots relative to the door 52 so that the double-sided conveying path C is opened up. Then, as illustrated in FIG. 6, the regulated portion 51*c* is brought into contact with the regulating portion 21*a*.

Figure 6:
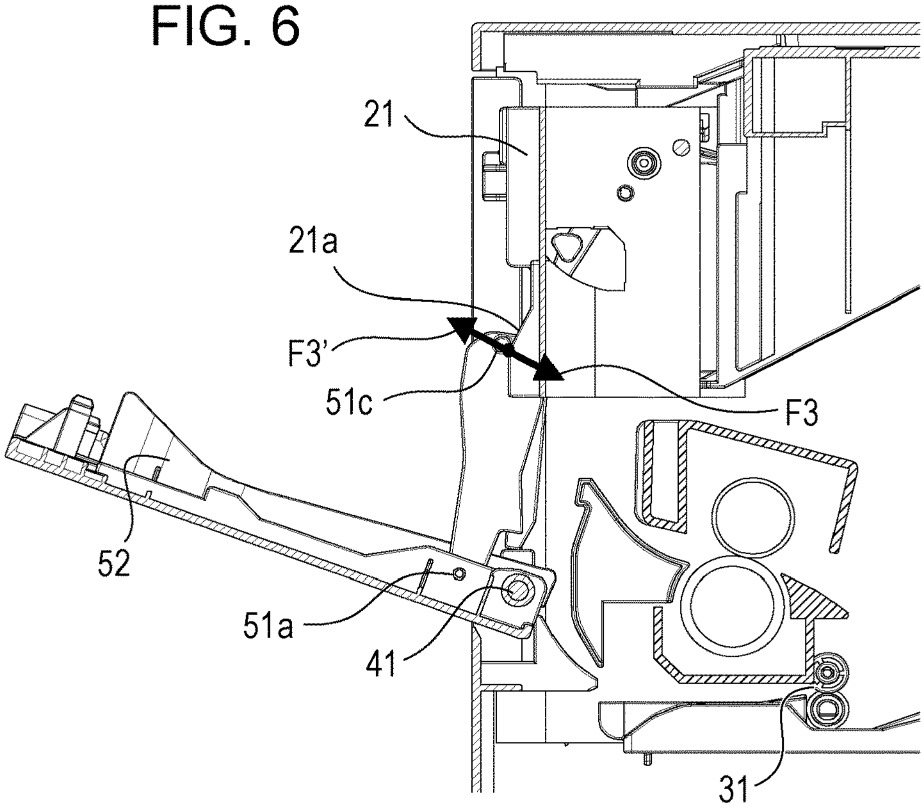
FIG. 6 illustrates the door in the open position and the conveyance guide that is rotated according to the first embodiment.

As illustrated in FIG. 6, when the door 52 is opened and then the regulated portion 51*c* is brought into contact with the regulating portion 21*a*, the conveyance guide 51 presses the regulating portion 21*a* by using a force F3, and the regulating portion 21*a* presses the conveyance guide 51 by using a reaction force F3' of the force F3.

According to the configuration of the present embodiment, the force applied to the guide support portion 51*a* is smaller than that of the configuration in which the door 52 has a portion to regulate the rotation of the conveyance guide 51 (the comparative example). As a result, the rigidity around the guide support portion 51*a* can be reduced, which reduces the component cost.

In addition, in the portion P illustrated in FIG. 5B, a space is formed between the sheet guide portion 52*b* and the sheet guide portion 51*b*, regardless of the opening angle of the conveyance guide 51 relative to the door 52. That is, the conveyance guide 51 is configured to be movable between the first and second positions relative to the door 52. Thus, the conveyance guide 51 is movable between the first and second positions with a gap between the conveyance guide 51 and the sheet guide portion 52*b*. As a result, the sheet S is prevented from being caught between the sheet guide portion 52*b* and the sheet guide portion 51*b* in the portion P.

Connection Between Conveyance Guide and Door

The configuration for connecting the conveyance guide 51 with the door 52 is described in more detail below with reference to FIG. 7, FIGS. 8A to 8C, and FIG. 9.

Figure 7:
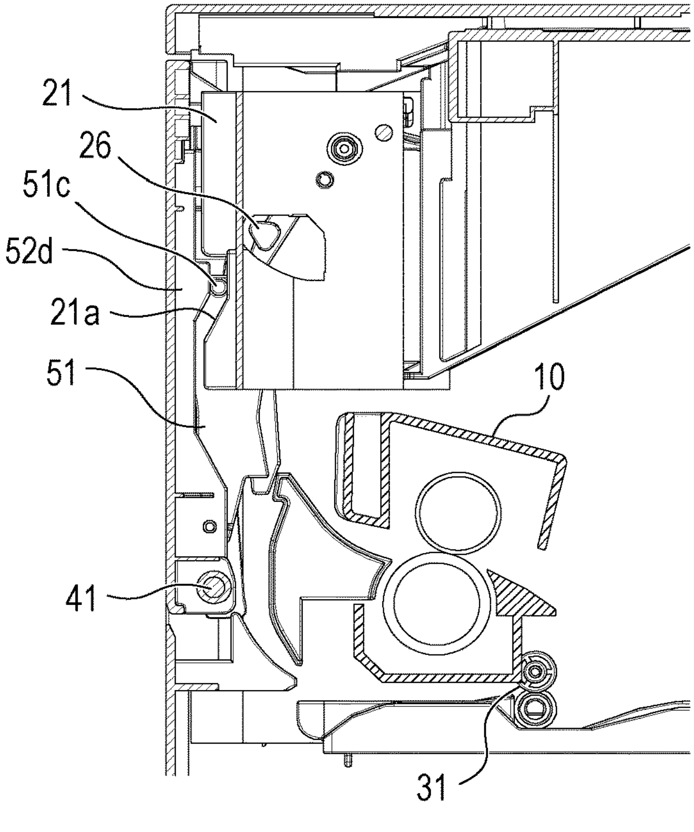
FIG. 7 is a cross-sectional view of the image forming apparatus with the door in the closed position according to the first embodiment.
Figure 8A:
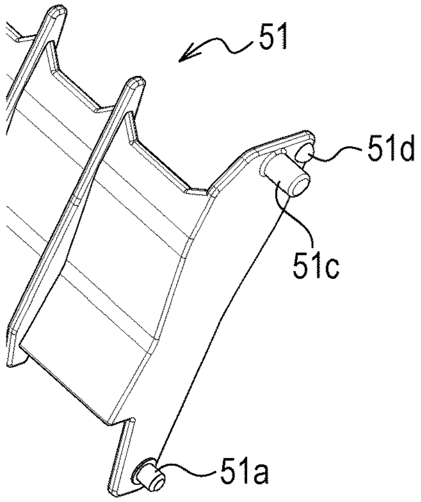
FIGS. 8A to 8C illustrate engagement of the door with the conveyance guide according to the first embodiment.
Figure 8B:
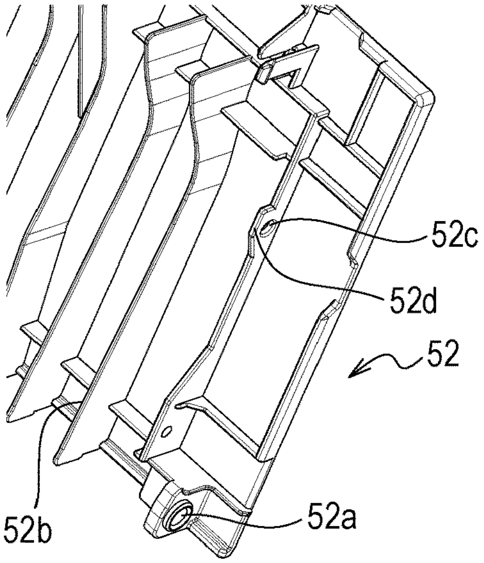
Figure 8C:
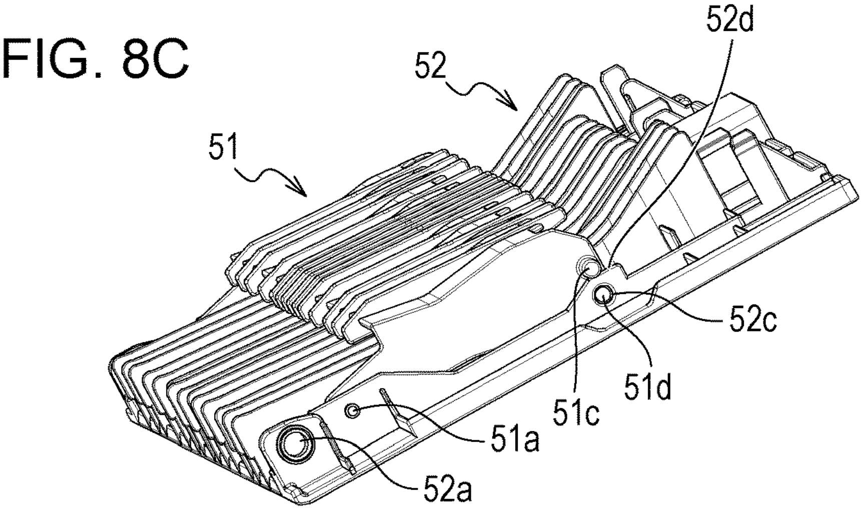
Figure 9:
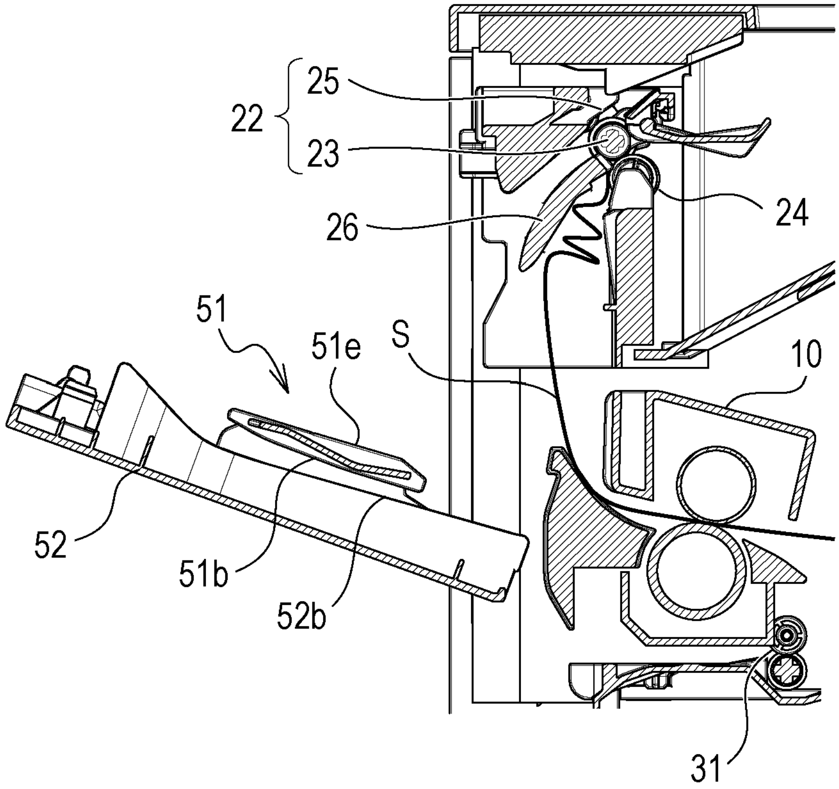
FIG. 9 is a cross-sectional view of the image forming apparatus with the door in the open position according to the first embodiment.

FIG. 7 is a cross-sectional view of the image forming apparatus 1 with the door 52 in the closed position. FIGS. 8A to 8C illustrate engagement of the door 52 with the conveyance guide 51. FIG. 8A is a perspective view of the conveyance guide 51. FIG. 8B is a perspective view of the door 52. FIG. 8C is a perspective view of the door 52 engaged with the conveyance guide 51. FIG. 9 is a cross-sectional view of the image forming apparatus 1 with the door 52 in the open position.

As illustrated in FIG. 7, when the door 52 is in the closed position, the regulated portion 51*c* of the conveyance guide 51 is nipped between a guide regulating portion 52*d* provided on the door 52 and the regulating portion 21*a*, which is a part of the discharging frame 21. Thus, the rotation of the regulated portion 51*c* is regulated. As a result, the relative positional accuracy between the duplex flapper 26 and the conveyance guide 51 supported by the discharging frame 21 can be maintained at a high level. In addition, the relative positional accuracy between the sheet guide portion 52*b* of the door 52 and the conveyance guide 51 can be maintained at a high level.

As illustrated in FIG. 8A, the conveyance guide 51 has a protruding portion (an engaging portion) 51*d*. As illustrated in FIG. 8B, the door 52 has a hole (an engaged portion) 52*c*. When the hole 52*c* and the protruding portion 51*d* are in engagement, the rotation of the conveyance guide 51 with respect to the door 52 is regulated. When the hole 52*c* and the protruding portion 51*d* are not in engagement, the conveyance guide 51 is allowed to pivot with respect to the door 52.

As illustrated in FIG. 8C, when the conveyance guide 51 is in the closed position against the door 52, the protruding portion 51*d* of the conveyance guide 51 is engaged with the hole 52*c* of the door 52.

When the door 52 is opened with a jammed sheet S in the double-sided conveying path C, the force F3 is applied to the conveyance guide 51. The engagement force of the protruding portion 51*d* to engage with the hole 52*c* (the force required for the protruding portion 51*d* to disengage from the hole 52*c*) is set to be less than the force F3. For this reason, when the door 52 is opened with a jammed sheet S in the double-sided conveying path C, the protruding portion 51*d* disengages from the hole 52*c*, and the conveyance guide 51 is in the open position with respect to the door 52.

In contrast, when the door 52 is opened with no sheet S in the duplex conveying path C, the protruding portion 51*d* remains engaged with the hole 52*c*. As a result, the conveyance guide 51 remains in the closed position with respect to the door 52, and the conveyance guide 51 and the door 52 move together.

As illustrated in FIG. 2 and FIG. 9, the conveyance guide 51 has a sheet guide portion (a third guide portion) 51*e* configured to guide the conveyed sheet S toward the discharge roller 23. The sheet S can be brought into contact with the sheet guide portion 51*e*. The sheet guide portion 51*e* is located on the back side of the sheet guide portion 51*b*. If the sheet S guided by the sheet guide portion 51*e* is jammed between the discharge roller 23 and the sheet discharge driven roller 24, the door 52 is opened to remove the sheet S. At this time, the door 52 and the conveyance guide 51 are opened from the apparatus main body 100A with the protruding portion 51*d* engaged with the hole 52*c*. That is, the user's operation to remove the sheet S is not interfered by the conveyance guide 51.

Second Embodiment

The configuration according to the second embodiment is described below with reference to FIGS. 10A, 10B, 11A, 11B, 12A, 12B, 13A, 13B, and 14. Note that according to the second embodiment, description is not repeated for most constituent elements common to those in the first embodiment. A constituent element including a configuration the same as that described in the first embodiment is given the same reference numeral, and description of the element is not repeated.

According to the first embodiment, when the door 52 is opened with a jammed sheet S in the double-sided conveying path C, the regulated portion 51*c* and the regulating portion 21*a* are brought into contact with each other, regardless of the opening angle of the door 52. That is, the case may arise where the door 52 is moved from the closed position to the open position with the regulated portion 51*c* and the regulating portion 21*a* in a sliding contact with each other.

In contrast, as described below, according to the second embodiment, a conveyance guide 61 has two regulated portions. That is, the regulated portion of the conveyance guide 61 includes a first regulated portion 61*e* and a second regulated portion 61*c*. The portion of the regulated portion that slides over the regulating portion 21*a* is switched between the first regulated portion 61*e* and the second regulated portion 61*c* in accordance with the opening angle of the door 52.

Figure 10A:
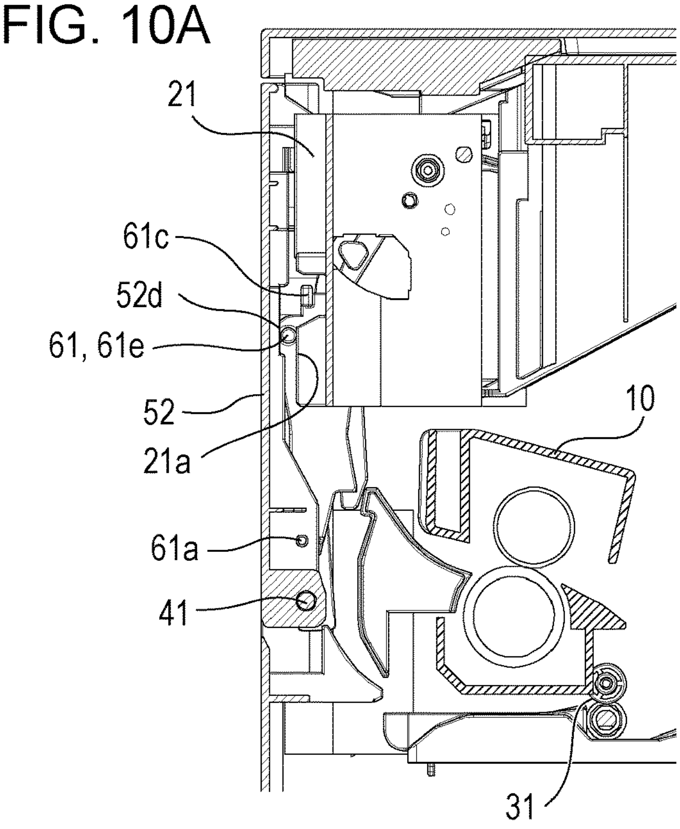
FIGS. 10A and 10B illustrate a door in the closed position according to a second embodiment.
Figure 10B:
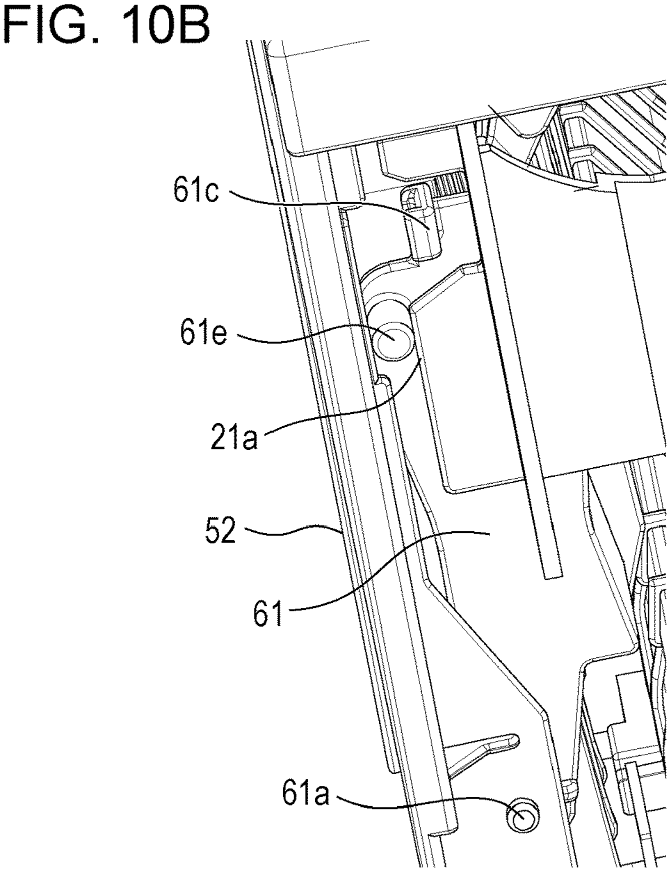

FIGS. 10A and 10B illustrate the door 52 in the closed position according to the second embodiment. FIG. 10A is a cross-sectional view of the door 52, and FIG. 10B is a perspective view of the door 52.

Figure 11A:
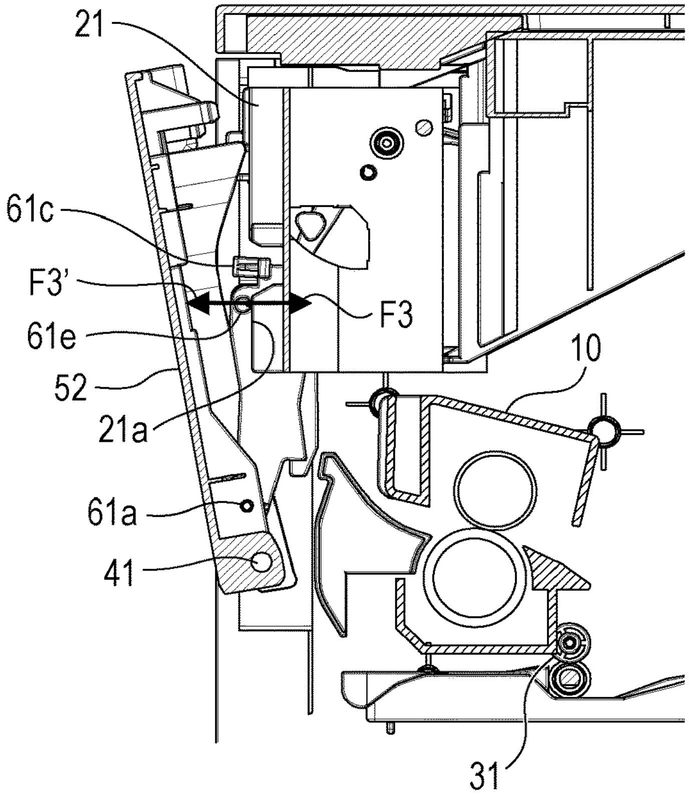
FIGS. 11A and 11B illustrate a door that is open from the closed position at an angle less than a first angle, according to the second embodiment.
Figure 11B:
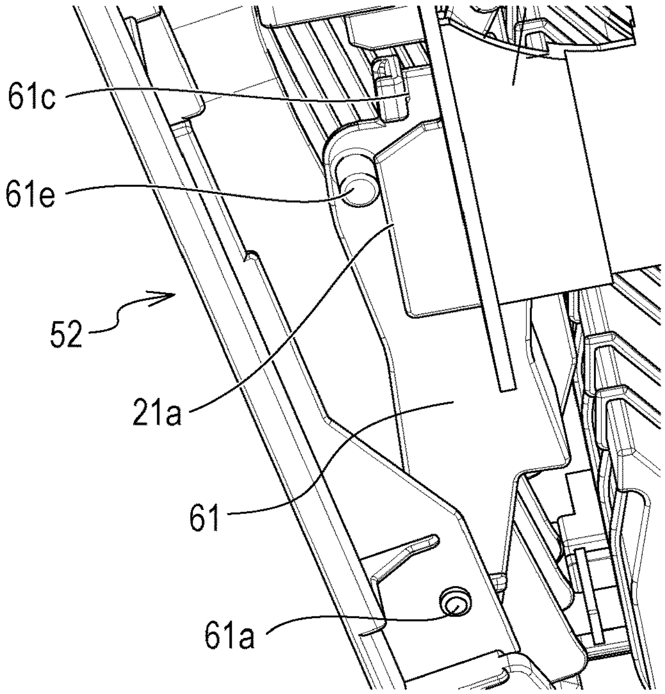

FIGS. 11A and 11B illustrate the door 52 that has been opened from the closed position at an angle less than a first angle according to the second embodiment. FIG. 11A is a cross-sectional view of the door 52, and FIG. 11B is a perspective view of the door 52.

Figure 12A:
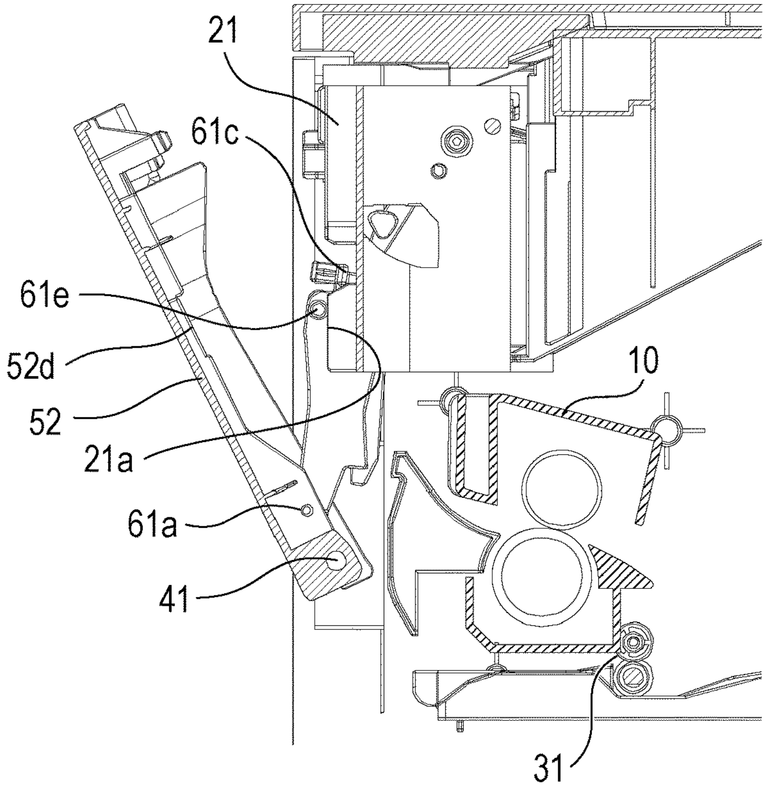
FIGS. 12A and 12B illustrate the door that is opened from the closed position at the first angle, according to the second embodiment.
Figure 12B:
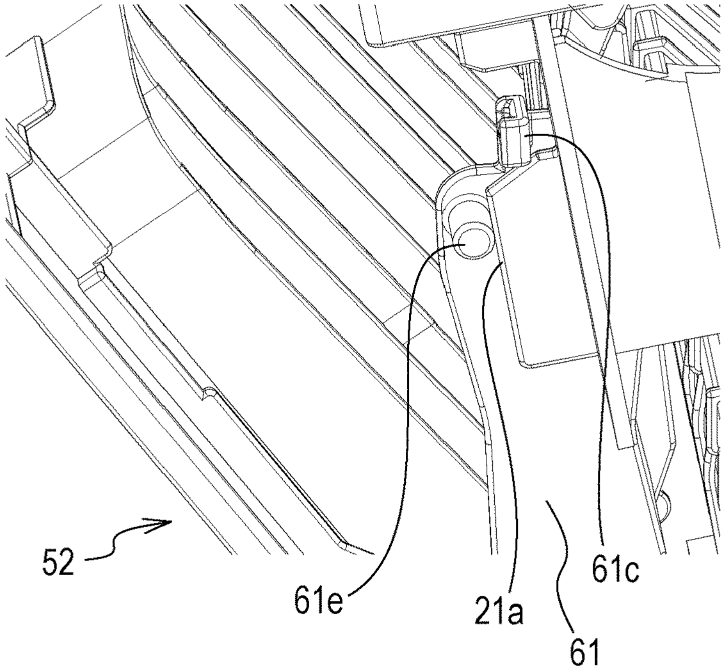

FIGS. 12A and 12B illustrate the door 52 that has been opened from the closed position at the first angle according to the second embodiment. FIG. 12A is a cross-sectional view of the door 52, and FIG. 12B is a perspective view of the door 52.

Figure 13A:
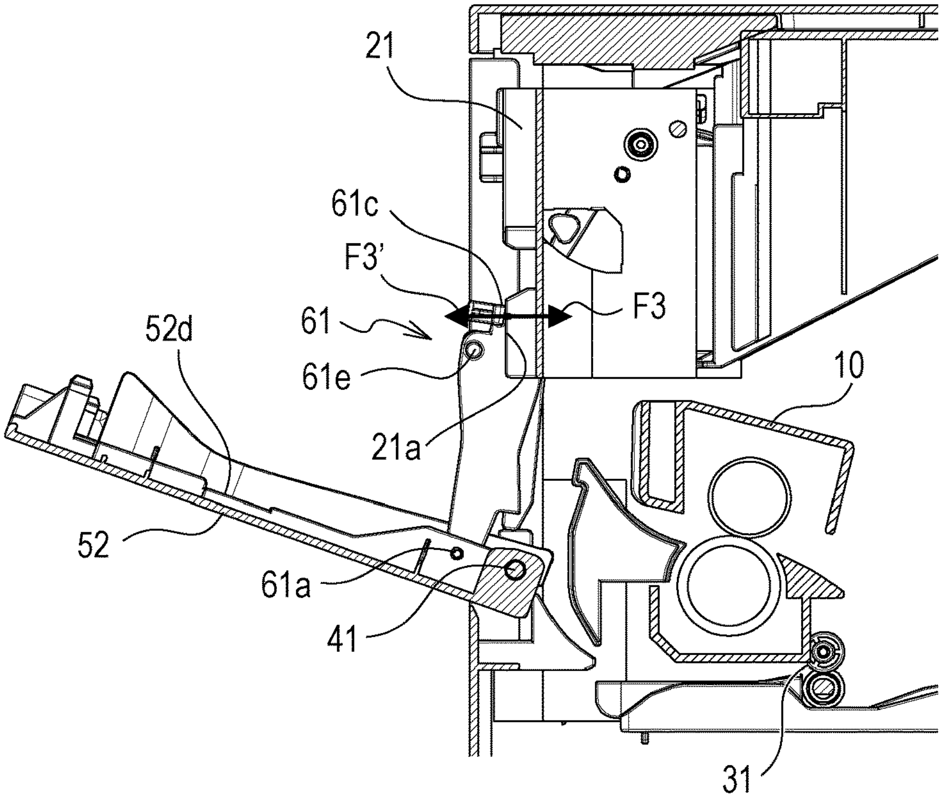
FIGS. 13A and 13B illustrate the door that is open from the closed position at an angle greater than the first angle, according to the second embodiment.
Figure 13B:
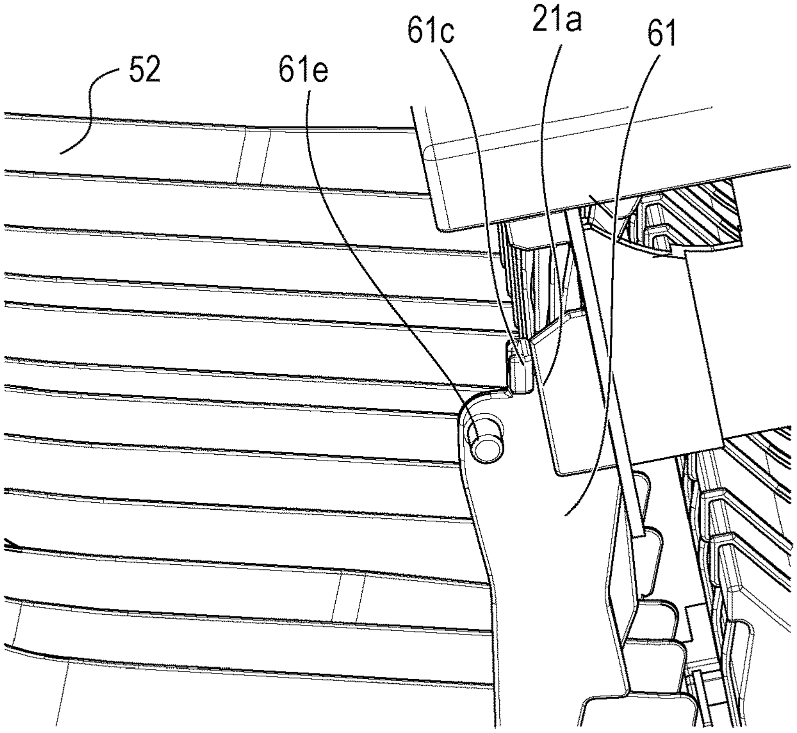

FIGS. 13A and 13B illustrate the door 52 that has been opened from the closed position at an angle greater than the first angle according to the second embodiment. FIG. 13A is a cross-sectional view of the door 52, and FIG. 13B is a perspective view of the door 52. FIGS. 13A and 13B illustrate the door 52 that has been fully opened from the closed position.

FIG. 10A, FIG. 11A, FIG. 12A, and FIG. 13A are views as viewed in the direction of the axis of rotation of the door 52 and the axis of rotation of the conveyance guide 61.

When the conveyance guide 61 rotates in the away direction under the condition that the opening angle of the door 52 from the closed position is less than the first angle, the first regulated portion 61*e* and the regulating portion 21*a* are brought into contact with each other, and the rotation of the conveyance guide 61 is regulated. When the conveyance guide 61 is rotated in the away direction under the condition that the opening angle of the door 52 from the closed position is the first angle or greater, the second regulated portion 61*c* and the regulating portion 21*a* are brought into contact with each other and, thus, the rotation of the conveyance guide 61 is regulated.

As illustrated in FIGS. 10A and 10B, when the door 52 is in the closed position, the first regulated portion 61*e* of the conveyance guide 61 is nipped between the guide regulating portion 52*d* and the regulating portion 21*a* and, thus, the rotation of the conveyance guide 61 is regulated.

As illustrated in FIGS. 11A and 11B, when the door 52 is open from the closed position at an angle less than the first angle and then the conveyance guide 61 rotates in the away direction, the first regulated portion 61*e* and the regulating portion 21*a* are brought into contact with each other. Thus, the rotation of the conveyance guide 61 is regulated.

As illustrated in FIGS. 12A and 12B, when the door 52 is open from the closed position at the first angle, the portion in contact with the regulating portion 21*a* to regulate the rotation of the door 52 switches from the first regulated portion 61*e* to the second regulated portion 61*c*.

When the door 52 is open from the closed position at an angle greater than or equal to the first angle and then the conveyance guide 61 rotates in the away direction, the second regulated portion 61*c* and the regulating portion 21*a* are brought into contact with each other and, thus, the rotation of the conveyance guide 61 is regulated. For example, as illustrated in FIGS. 13A and 13B, when the door 52 is fully open from the closed position, the rotation of the conveyance guide 61 is regulated by contact of the second regulated portion 61*c* with the regulating portion 21*a*. However, the first regulated portion 61*e* is separated from the regulating portion 21*a*.

As described above, the portion of the conveyance guide 61 that slides over the regulating portion 21*a* switches from the first regulated portion 61*e* to the second regulated portion 61*c* in accordance with the opening angle of the door 52. As a result, the first regulated portion 61*e* and the second regulated portion 61*c* are prevented from scraping off caused by rubbing against the regulating portion 21*a*. As described above, when the door 52 is in the closed position, the positioning of the conveyance guide 61 is performed by the first regulated portion 61*e* being nipped between the guide regulating portion 52*d* and the regulating portion 21*a*. For this reason, by preventing the first regulated portion 61*e* from being scraped off, the conveyance guide 61 can be positioned accurately when the door 52 is in the closed position.

Like the first embodiment, by regulating the first regulated portion 61*e* and the second regulated portion 61*c* by using the regulating portion 21*a* of the apparatus main body 100A, the load imposed on the vicinity of the rotational center 61*a* of the door 52 can be reduced, as compared with the case where the door is regulated by using the door 52. For this reason, there is no need to increase the rigidity in the vicinity of the rotational center 61*a*, and the cost of parts can be reduced.

In contrast, according to the second embodiment, the configuration for regulating the rotation of the conveyance guide 61 relative to the door 52 differs from that described in the first embodiment. The configuration for regulating the rotation of the conveyance guide 61 relative to the door 52 according to the second embodiment is described below with reference to FIG. 14.

Figure 14:
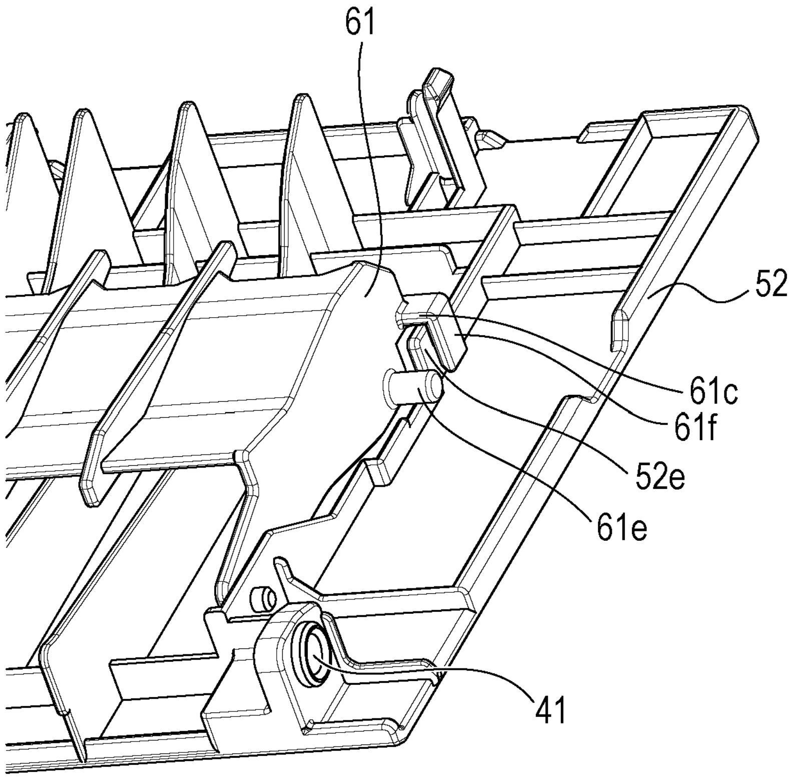
FIG. 14 is a perspective view of the door and a conveyance guide according to the second embodiment.

FIG. 14 is a perspective view of the door 52 and the conveyance guide 61 according to the second embodiment.

As illustrated in FIG. 14, the conveyance guide 61 has a pinching portion (an engaging portion) 61*f* on the back side of the second regulated portion 61*c*. The door 52 has a rib (an engaged portion) 52*e*. When the pinching portion 61*f* is engaged with the rib 52*e*, the rotation of the conveyance guide 61 relative to the door 52 is regulated. When the pinching portion 61*f* is disengaged with the rib 52*e*, the conveyance guide 61 is enabled to pivot relative to the door 52.

When the conveyance guide 61 is in the closed position with respect to the door 52, the pinching portion 61*f* is engaged with the rib 52*e*. When the door 52 is open with a jammed sheet S in the double-sided conveying path C, the force F3 is applied to the conveyance guide 61 (refer to FIG. 6). The force of the pinching portion 61*f* to pinch the rib 52*e* (the force required to disengage the pinching portion 61*f* from the rib 52*e*) is set to be less than the force F3. For this reason, when the door 52 is opened with a jammed sheet S in the double-sided conveying path C, the pinching portion 61*f* is disengaged from the rib 52*e*. Thus, the conveyance guide 61 is in the open position with respect to the door 52.

In contrast, when the door 52 is opened with no sheet S in the duplex conveying path C, engagement of the pinching portion 61*f* with the rib 52*e* is maintained, so that the conveyance guide 61 remains in the closed position with respect to the door 52.

As a result, like the first embodiment, even if there is a sheet S jammed in the conveyance path between the fixing unit 10 and the nip between the discharge roller 23 and the sheet discharge driven roller 24, the user's operation to remove the sheet S is not interfered by the conveyance guide 61.

The configurations of the embodiments can be combined in any way as needed.

As described above, the present disclosure can provide a conveyance device capable of preventing a large load from acting on the vicinity of the pivot axis of the conveyance guide when an opening/closing door is opened with a sheet jammed between the opening/closing door and the conveyance guide and an image forming apparatus using the conveyance device.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-027932 filed Feb. 24, 2021, which is hereby incorporated by reference herein in its entirety.

What is claimed is:

1. A conveyance device configured to convey a sheet, the conveyance device comprising:

an apparatus main body including a regulating portion;

an opening/closing door including a first guide portion configured to guide the sheet;

a conveyance guide supported by the opening/closing door in a pivotable manner about a pivot axis, wherein the conveyance guide includes a second guide portion configured to guide the sheet and a regulated portion, where the second guide portion is disposed facing the first guide portion so that a first path through which the sheet passes is formed between the first guide portion and the second guide portion; and a conveyance unit including a conveyance roller configured to convey the sheet toward the first path, wherein the opening/closing door is configured to be movable relative to the apparatus main body between a closed position at which the conveyance guide is placed between the apparatus main body and the opening/closing door and an open position at which the conveyance guide is retracted from the closed position, wherein, when the conveyance guide pivots in an away direction in which the second guide portion moves away from the first guide portion in a state where the opening/closing door is in the open position, the regulated portion is brought into contact with the regulating portion to regulate rotation of the conveyance guide in the away direction, and wherein the second guide portion and the regulated portion are disposed on one side of the pivot axis in a perpendicular direction that is perpendicular to a direction of the pivot axis.

2. The conveyance device according to claim 1, wherein the conveyance guide has a first end portion and a second end portion opposite to the first end portion in the perpendicular direction, and wherein the pivot axis is disposed closer to the first end portion than to a central portion of the conveyance guide, and the regulated portion is disposed closer to the second end portion than to the central portion of the conveyance guide in the perpendicular direction.

3. The conveyance device according to claim 1, wherein, when the conveyance roller is defined as a first conveyance roller, the conveyance unit includes a second conveyance roller configured to convey the sheet conveyed by the first conveyance roller, and wherein the first path is disposed between the first conveyance roller and the second conveyance roller such that the second conveyance roller conveys the sheet that has passed through the first path.

4. The conveyance device according to claim 3, further comprising a sheet feed tray configured to allow the sheet to be stacked on the sheet feed tray, wherein the sheet feed tray is capable of stacking the sheet including such a length as to be in contact with the second conveyance roller while being in contact with the first conveyance roller.

5. The conveyance device according to claim 1, wherein the conveyance roller is rotatable in a first rotation direction and a second rotation direction opposite to the first rotation direction, and wherein the conveyance roller conveys the sheet toward an outside of the apparatus main body by rotating in the first rotation direction and conveys the sheet toward the first path by rotating in the second rotation direction.

6. The conveyance device according to claim 5, wherein the conveyance guide has a third guide portion disposed on a back side of the second guide portion and configured to guide the sheet being conveyed in a direction closer to the conveyance roller.

7. The conveyance device according to claim 5, wherein the conveyance unit includes a discharge portion configured to discharge the sheet from the apparatus main body and a reverse conveyance portion configured to convey the sheet toward the first path by using the conveyance roller, and wherein the apparatus main body includes a reverse frame having the regulating portion and supporting a switching member capable of selectively moving to a first guide position that leads the sheet to the discharge portion and a second guide position that leads the sheet to the reverse conveyance portion.

8. The conveyance device according to claim 1, wherein the regulated portion is disposed at a position closer to an upstream end of the conveyance guide than to a downstream end of the conveyance guide in a conveyance direction of the sheet in the first path.

9. The conveyance device according to claim 1, wherein, when the conveyance guide pivots in the away direction with the opening/closing door located between the closed position and the open position, the regulated portion is capable of contacting the regulating portion.

10. The conveyance device according to claim 1, wherein the conveyance guide is configured to be movable relative to the opening/closing door between a first position and a second position, and wherein the conveyance guide is movable between the first position and the second position with a gap between the conveyance guide and the first guide portion.

11. The conveyance device according to claim 1, wherein the opening/closing door has an engaged portion, wherein the conveyance guide has an engaging portion, and wherein the rotation of the conveyance guide relative to the opening/closing door is regulated in a state where the engaged portion engages with the engaging portion, and the rotation of the conveyance guide relative to the opening/closing door is enabled in a state where the engaged portion disengages from the engaging portion.

12. The conveyance device according to claim 1, wherein the regulated portion includes a first regulated portion and a second regulated portion, wherein, when the conveyance guide pivots in the away direction in a state where an opening angle of the opening/closing door from the closed position is less than a first angle, the first regulated portion is brought into contact with the regulating portion to regulate the rotation of the conveyance guide, and wherein, when the conveyance guide pivots in the away direction in a state where the opening angle of the opening/closing door from the closed position is greater than or equal to the first angle, the second regulated portion is brought into contact with the regulating portion to regulate the rotation of the conveyance guide.

13. The conveyance device according to claim 1, wherein the regulating portion and the regulated portion are disposed outside of the first path in a direction of a rotational axis of the conveyance roller.

14. An image forming apparatus comprising:

the conveyance device according to claim 1; and an image forming unit configured to form an image on the sheet.

* * * * *